(12) United States Patent
Kerner et al.

(10) Patent No.: US 7,897,256 B2
(45) Date of Patent: Mar. 1, 2011

(54) SURFACE-MODIFIED, DOPED, PYROGENICALLY PRODUCED OXIDES

(75) Inventors: Dieter Kerner, Hanau (DE); Helmut Mangold, Rodenbach (DE); Jürgen Meyer, Stockstadt/Main (DE)

(73) Assignee: Evonik Degussa GmbH, Essen (DE)

( * ) Notice: Subject to any disclaimer, the term of this patent is extended or adjusted under 35 U.S.C. 154(b) by 0 days.

(21) Appl. No.: 10/084,336

(22) Filed: Feb. 28, 2002

(65) Prior Publication Data

US 2002/0168524 A1 Nov. 14, 2002

(30) Foreign Application Priority Data

Feb. 28, 2001 (DE) ................. 101 09 484

(51) Int. Cl.
*B32B 19/04* (2006.01)
(52) U.S. Cl. ............... 428/405; 428/403; 427/212; 427/215; 427/220
(58) Field of Classification Search ......... 427/387, 427/421, 212, 220, 215, 213.31, 221, 299; 428/391, 404, 405, 447; 523/212, 213; 423/335, 423/337, 592, 606, 608, 613, 624
See application file for complete search history.

(56) References Cited

U.S. PATENT DOCUMENTS

| | | | | | |
|---|---|---|---|---|---|
| 3,122,520 | A | * | 2/1964 | Lentz | ............ 106/490 |
| 3,924,029 | A | * | 12/1975 | Schutte et al. | ............ 427/213 |
| 4,001,128 | A | * | 1/1977 | Penneck | ............ 524/263 |
| 4,022,152 | A | * | 5/1977 | Laufer et al. | ............ 118/716 |
| 4,101,499 | A | * | 7/1978 | Herzig | ............ 524/731 |
| 4,849,022 | A | * | 7/1989 | Kobayashi et al. | ............ 106/490 |
| 4,886,661 | A | * | 12/1989 | Cyprien et al. | ............ 424/78.25 |
| 5,008,305 | A | * | 4/1991 | Kennan et al. | ............ 523/212 |
| 5,384,194 | A | * | 1/1995 | Deusser et al. | ............ 428/405 |
| 5,415,936 | A | * | 5/1995 | Deusser et al. | ............ 428/405 |
| 5,486,420 | A | * | 1/1996 | Nishihara et al. | ............ 428/405 |
| 5,686,054 | A | * | 11/1997 | Barthel et al. | ............ 423/335 |
| 5,718,907 | A | * | 2/1998 | Labarre | ............ 424/401 |
| 5,776,240 | A | * | 7/1998 | Deller et al. | ............ 106/482 |
| 6,288,143 | B1 | * | 9/2001 | Caradori et al. | ............ 523/213 |
| 6,316,050 | B1 | | 11/2001 | Troll et al. | |
| 6,328,944 | B1 | * | 12/2001 | Mangold et al. | ............ 423/278 |
| 6,462,104 | B1 | * | 10/2002 | Canpont et al. | ............ 523/213 |
| 2002/0018741 | A1 | * | 2/2002 | Hemme et al. | ............ 423/210 |
| 2003/0185739 | A1 | * | 10/2003 | Mangold et al. | ............ 423/335 |

FOREIGN PATENT DOCUMENTS

| | | |
|---|---|---|
| CA | 2223377 A * | 6/1998 |
| CA | 2312249 | 6/2000 |
| DE | 198 47 161 A1 | 4/2000 |
| JP | 2000-169132 A * | 6/2000 |

OTHER PUBLICATIONS

Handbook of Fillers, 2nd Edition authored/edited by Wypych, 1999, Chem Tec Publishing.*
Text view of relevant passages taken from U.S. Patent # 6,384,125.*
Text view of relevant passages taken from U.S. Patent # 6,051,672.*
Text view of relevant passages taken from U.S. Patent # 4,344,800.*

* cited by examiner

*Primary Examiner*—Marc S Zimmer
(74) *Attorney, Agent, or Firm*—Smith, Gambrell & Russell, LLP

(57) ABSTRACT

Surface-modified, doped, pyrogenically produced oxides surface-modified with one or several compounds from the following groups:

Figure 1:
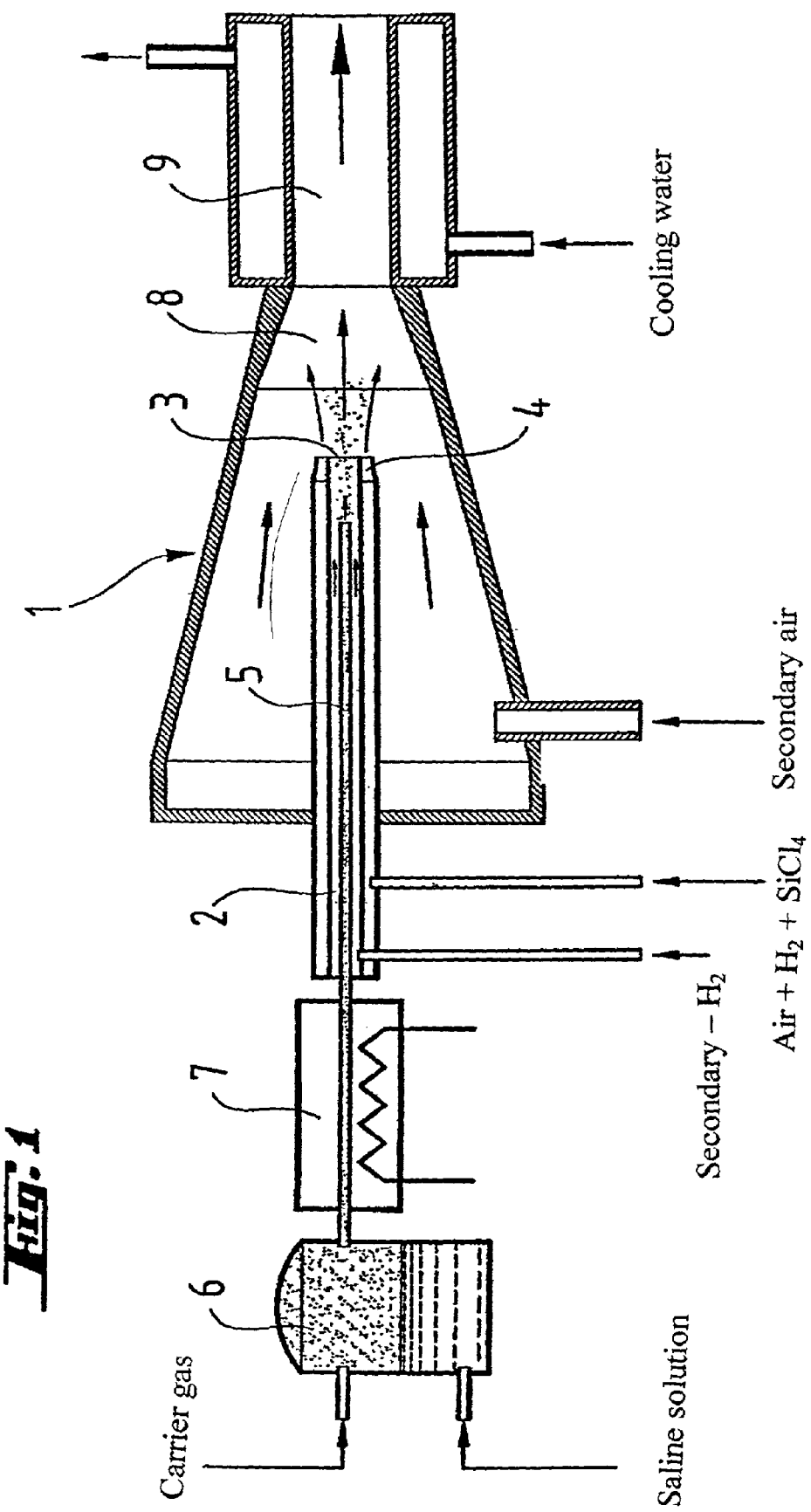

a) Organosilanes of the type $(RO)_3Si(C_nH_{2n+1})$, $(RO)_3Si(C_nH_{2n-1})$
b) $R'_x(RO)_ySi(C_nH_{2n+1})$, $(RO)_3Si(C_nH_{2n+1})$
c) $X_3Si(C_nH_{2n+1})$, $X_3Si(C_nH_{2n-1})$
d) $X_2(R')Si(C_nH_{2n+1})$, $X_2(R')Si(C_nH_{2n-1})$
e) $X(R')_2Si(C_nH_{2n+1})$, $X(R')_2Si(C_nH_{2n-1})$
f) $(RO)_3Si(CH_2)_m$—R',
g) $(R'')_x(RO)_ySi(CH_2)_m$—R',
h) $X_3Si(CH_2)_m$—R',
i) $(R)X_2Si(CH_2)_m$—R',
j) $(R)_2XSi(CH_2)_m$—R',
k) Silazanes of the type

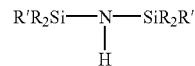

l) Cyclic polysiloxanes,
m) Polysiloxanes or silicone oils.

2 Claims, 1 Drawing Sheet

SURFACE-MODIFIED, DOPED, PYROGENICALLY PRODUCED OXIDES

BACKGROUND OF THE INVENTION

1. Field of Invention

The invention relates to a surface-modified, doped, pyrogenically produced oxides, a method of their production and their use.

2. Description of Related Art

Pyrogenically produced oxides doped by aerosol are known, e.g., DE 196 50 500 A1.

SUMMARY OF THE INVENTION

The invention has as subject matter surface-modified, pyrogenically produced oxides doped by aerosol. The surface-modified, pyrogenically produced oxides doped by aerosol can preferably be characterized in that the oxides are from the group $SiO_2$, $Al_2O_3$, $TiO_2$, $B_2O_3$, $ZrO_2$, $In_2O_3$, $ZnO$, $Fe_2O_3$, $Nb_2O_5$, $V_2O_5$, $WO_3$, $SnO_2$, $GeO_2$.

The surface modification can take place with one or more compounds from the following groups:

a) Organosilanes of the type $(RO)_3Si(C_nH_{2n+1})$ and $(RO)_3Si(C_nH_{2n-1})$
  R=alkyl, such as, e.g., methyl-, ethyl-, n-propyl-, i-propyl-, butyl-
  n=1-20 b) Organosilanes of the type $R'_x(RO)_ySi(C_nH_{2n+1})$ and $(RO)_3Si(C_nH_{2n+1})$
  R=alkyl, such as, e.g., methyl-, ethyl-, n-propyl-, i-propyl-, butyl-
  R'=alkyl, such as, e.g., methyl-, ethyl-, n-propyl-, i-propyl-, butyl-
  R'=cycloalkyl
  N=1-20
  x+y=3
  x=1, 2
  y=1, 2 c) Halogen organosilanes of the type $X_3Si(C_nH_{2n+1})$ and $X_3Si(C_nH_{2n-1})$
  X=Cl, Br
  n=1-20 d) Halogen organosilanes of the type $X_2(R')Si(C_nH_{2n+1})$ and $X_2(R')Si(C_nH_{2n-1})$
  X=Cl, Br
  R'=alkyl, such as, e.g., methyl-, ethyl-, n-propyl-, i-propyl-, butyl-
  R'=cycloalkyl
  n=1-20 e) Halogen organosilanes of the type $X(R')_2Si(C_nH_{2n+1})$ and $X(R')_2Si(C_nH_{2n-1})$
  X=Cl, Br
  R'=alkyl, such as, e.g., methyl-, ethyl-
  R'=cycloalkyl
  n-propyl-, i-propyl-, butyl-
  n=1-20 f) Organosilanes of the type $(RO)_3Si(CH_2)_m$—R'
  R=alkyl, such as methyl-, ethyl-, propyl-
  m=0, 1-20
  R'=methyl-, aryl (e.g., —$C_6H_5$, substituted phenyl groups)
  —$C_4F_9$, —$OCF_2$—CHF—$CF_3$, —$C_6F_{13}$, —O—$CF_2$—$CHF_2$
  —$NH_2$, =$N_3$, —SCN, —CH=$CH_2$, —NH—$CH_2$—$CH_2$—$NH_2$,
  —N—($CH_2$—$CH_2$—$CH_2NH_2$)$_2$
  —OOC($CH_3$)C=$CH_2$
  —$OCH_2$—CH(O)$CH_2$
  —NH—CO—N—CO—($CH_2$)$_5$
  —NH—COO—$CH_3$, —NH—COO—$CH_2$—$CH_3$,
  —NH—($CH_2$)$_3$Si(OR)$_3$
  —$S_x$—($CH_2$)$_3$Si(OR)$_3$
  —SH
  —NR'R''R'''(R'=alkyl, aryl; R''=H, alkyl, aryl; R'''=H, alkyl, aryl, benzyl, $C_2H_4NR''''R'''''$ with R''''=H, alkyl and R'''''=H, alkyl g) Organosilanes of the type $(R'')_x(RO)_ySi(CH_2)_m$—R'
  R''=alkyl x+y=2
  =cycloalkyl x=1, 2
  y=1, 2
  m=0.1 to 20
  R'=methyl-, aryl (e.g., —$C_6H_5$, substituted phenyl groups)
  —$C_4F_9$, —$OCF_2$—CHF—$CF_3$, —$C_6F_{13}$, —$CF_2$—$CHF_2$
  —$NH_2$, —$N_3$, SCN, —CH=$CH_2$, —NH—$CH_2$—$CH_2$—$NH_2$,
  —N—($CH_2$—$CH_2$—$NH_2$)$_2$
  —OOC($CH_3$)C=$CH_2$
  —$OCH_2$—CH(O)$CH_2$
  —NH—CO—N—CO—($CH_2$)$_5$
  —NH—COO—$CH_3$, —NH—COO—$CH_2$—$CH_3$,
  —NH—($CH_2$)$_3$Si(OR)$_3$
  —$S_x$—($CH_2$)$_3$Si(OR)$_3$
  —SH—NR'R''R'''(R'=alkyl, aryl; R''=H, alkyl, aryl; R'''=H, alkyl, aryl, benzyl,
  $C_2H_4NR''''R'''''$ with R''''=H, alkyl and
  R'''''=H, alkyl)

h) Halogen organosilanes of the type $X_3Si(CH_2)_m$—R'
  X=Cl, Br
  m=0, 1-20
  R'=methyl-, aryl (e.g., —$C_6H_5$, substituted phenyl groups)
  —$C_4F_9$, —$OCF_2$—CHF—$CF_3$, —$C_6F_{13}$, —O—$CF_2$—$CHF_2$
  —$NH_2$, —$N_3$, —SCN, —CH=$CH_2$, —NH—$CH_2$—$CH_2$—$NH_2$,
  —N—($CH_2$—$CH_2$—$NH_2$)$_2$
  —OOC($CH_3$)C=$CH_2$
  —$OCH_2$—CH(O)$CH_2$
  —NH—CO—N—CO—($CH_2$)$_5$
  —NH—COO—$CH_3$, —NH—COO—$CH_2$—$CH_3$,
  —NH—($CH_2$)$_3$Si(OR)$_3$
  —$S_x$—($CH_2$)$_3$Si(OR)$_3$
  —SH i) Halogen organosilanes of the type $(R)X_2Si(CH_2)_m$—R'
  X=Cl, Br
  R=alkyl, such as methyl-, ethyl-, propyl-
  m=0, 1-20
  R'=methyl-, aryl (e.g., —$C_6H_5$, substituted phenyl groups)
  —$C_4F_9$, —$OCF_2$—CHF—$CF_3$, —$C_6F_{13}$, —O—$CF_2$—$CHF_2$
  —$NH_2$, —$N_3$, SCN, —CH=$CH_2$, —NH—$CH_2$—$CH_2$—$NH_2$,
  —N—($CH_2$—$CH_2$—$NH_2$)$_2$
  —OOC($CH_3$)C=$CH_2$
  —$OCH_2$—CH(O)$CH_2$
  —NH—CO—N—CO—($CH_2$)$_5$
  —NH—COO—$CH_3$, —NH—COO—$CH_2$—$CH_3$,
  —NH—($CH_2$)$_3$Si(OR)$_3$,
  in which R=methyl-, ethyl-, propyl-, butyl-
  —$S_x$—($CH_2$)$_3$Si(OR)$_3$, in which R can=methyl-, ethyl-, propyl-,
  butyl-
  —SH j) Halogen organosilanes of the type $(R)_2XSi(CH_2)_m$—R'
   X=Cl, Br
   R=alkyl
   m=0, 1-20
   R'=methyl-, aryl (e.g., —$C_6H_5$, substituted phenyl groups) —$C_4F_9$, —$OCF_2$—CHF—$CF_3$, —$C_6F_{13}$, —O—$CF_2$—$CHF_2$
   —$NH_2$, —$N_3$, SCN, —CH=$CH_2$, —NH—$CH_2$—$CH_2$—$NH_2$,
   —N—$(CH_2$—$CH_2$—$NH_2)_2$
   —OOC$(CH_3)$C=$CH_2$
   —O$CH_2$—CH(O)$CH_2$
   —NH—CO—N—CO—$(CH_2)_5$
   —NH—COO—$CH_3$,   —NH—COO—$CH_2$—$CH_3$,
   —NH—$(CH_2)_3$Si$(OR)_3$
   —$S_x$—$(CH_2)_3$Si$(OR)_3$
   —SH
(k) Silazanes of the type

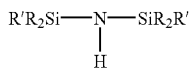

R=alkyl
R'=alkyl, vinyl
(l) Cyclic polysiloxanes of the type D 3, D 4, D 5, in which D 3, D 4 and D 5 denote cyclic polysiloxanes with 3, 4 or 5 units of the type —O—Si$(CH_3)_2$, e.g. octamethylcyclotetrasiloxane=D4

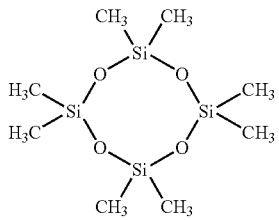

m) Polysiloxanes or silicone oils of the type

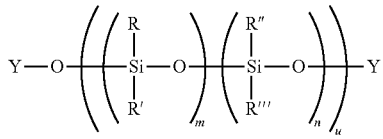

m = 0, 1, 2, 3, ... ∞
n = 0, 1, 2, 3, ... ∞
u = 0, 1, 2, 3, ... ∞
Y = $CH_3$, H, $C_nH_{2n+1}$ n = 1-20
Y = Si$(CH_3)_3$, Si$(CH_3)_2$H

Si$(CH_3)_2$OH, Si$(CH_3)_2$(O$CH_3$)
Si$(CH_3)_2$($C_nH_{2n+1}$)n=1-20
R=alkyl, such as $C_nH_{2n+1}$, in which n=1 to 20, aryl, such as phenyl- and substituted phenyl groups, $(CH_2)_n$—$NH_2$, H
R'=alkyl, such as $C_nH_{2n+1}$, in which n=1 to 20, aryl, such as phenyl- and substituted phenyl groups, $(CH_2)_n$—$NH_2$, H
R"=alkyl, such as $C_nH_{2n+1}$, in which n=1 to 20, aryl, such as phenyl- and substituted phenyl groups, $(CH_2)_n$—$NH_2$, H
R'''=alkyl, such as $C_nH_{2n+1}$, in which n=1 to 20, aryl, such as phenyl- and substituted phenyl groups, $(CH_2)_n$—$NH_2$, H Further subject matter of the invention is constituted by a method of producing the surface-modified, pyrogenically produced oxides doped by aerosol and in accordance with the invention, characterized in that pyrogenically produced oxides doped by aerosol are placed in a suitable mixing container, the pyrogenically produced oxides doped by aerosol are sprayed under intensive mixing, optionally with water and/or acid at first and subsequently with the surface-modification reagent or a mixture of several surface-modification reagents, optionally re-mixed 15 to 30 minutes and are subsequently tempered at a temperature of 100 to 400° C. for a period of 1 to 6 hours.

The water used can be acidified with an acid, e.g. hydrochloric acid, up to a pH of 7 to 1. The surface-modification reagent used can be dissolved in a suitable solvent such as, e.g., ethanol. The mixing and/or the tempering can be carried out in an atmosphere of protective gas such as, e.g., nitrogen.

Further subject matter of the invention includes a production method for surface-modified, pyrogenically produced oxides doped by aerosol where the pyrogenically produced oxide starting material is mixed as homogeneously as possible with organohalosilanes under conditions, where oxygen is excluded, followed by a step where the mixture is heated with slight amounts of water vapor and optionally, in a continuous stream of inert gas in a treatment chamber designed as an upright tubular oven at temperatures of 200 to 800° C., preferably 400 to 600° C., the solid and gaseous reaction products are then separated from each other and the solid products deacidified again if necessary and dried.

The pyrogenically produced oxides doped by aerosol can be doped, pyrogenically produced oxides of metals and/or metalloids in which the base components are oxides of metals and/or metalloids produced pyrogenically by flame hydrolysis that are doped with at least a doping component of 0.00001 to 20% by wt., the doping amount can be preferably in a range of 1 to 10,000 ppm and the doping component is a metalloid and/or metal or a metalloid salt and/or metal salt or an oxide of a metal and/or metalloids and the BET surface of the doped oxides is between 5 and 600 m²/g.

They can be produced in that an aerosol is fed into a flame such as is used to produce pyrogenic oxides by flame hydrolysis in a known manner, this aerosol is homogeneously mixed before the reaction with the gaseous mixture of the flame oxidation or flame hydrolysis, the aerosol/gaseous mixture is allowed to react in a flame and the doped, pyrogenically produced oxides that arise are separated in a known manner from the gas flow, that a saline solution or suspension containing the component of the substance to be doped, which can be a metal salt of metalloid salt of mixtures of both or a suspension of an insoluble metal compound or metalloid compound, serves as initial product and that the aerosol is produced by atomization by means of a two-fluid nozzle or by an aerosol generator preferably in accordance with the ultrasonic method or by some other type of aerosol generation. Such a method is shown in DE 196 50 500 A1.

The aerosol can be supplied in a preferred embodiment of the invention by a device like the one shown in FIG. 1. The lines for the supply of gas and aerosol can be exchanged with one another.

In a further embodiment the aerosol can be supplied by an annular nozzle arranged at any desired angle, preferably vertically to the main gas flow.

The metalloids/metals aluminum, niobium, titanium, tungsten, germanium, boron, indium, iron, vanadium, tungsten, zinc and/or silicon can be used as base component.

Metals and/or metalloids and their compounds, in as far as they can be dissolved or suspended in a liquid solution, can be used as doping component. In a preferred embodiment compounds of transitional metals and/or noble metals can be used.

For example, cerium and potassium salts can be used as doping components.

The method of flame hydrolysis for producing pyrogenic oxides is known from Ullmanns Enzylkopädie der technischen Chemie, 4$^{th}$ edition, volume 21, page 464.

As a result of the fine distribution of the doping component in the aerosol as well as the high temperatures (1,000 to 2,400° C.) in the subsequent flame hydrolysis in which the doping components are, if need be, further comminuted and/or melted, the doping medium is present in finely divided form in the gaseous phase during the genesis of the pyrogenic oxide so that a homogeneous inclusion of the doping component into the pyrogenically produced oxide is possible. However, the attainment of a homogeneous distribution of doping component is possible by means of a suitable selection of the initial salts and the type of process.

It is possible with the method of the invention to dope all known, pyrogenically produced oxides (e.g., $SiO_2$, $TiO_2$, $Al_2O_3$, $B_2O_3$, ZnO, $In_2O_3$, $ZrO_2$, $Fe_2O_3$, $GeO_2$, $V_2O_5$, $SnO_2$, $WO_3$, $Nb_2O_5$) with other metal oxides or metalloid oxides or their mixtures.

The aggregate structure or agglomerate structure of the pyrogenic oxide can be influenced by selecting suitable doping components. Moreover, the pH of the pyrogenic oxide can be influenced.

Catalytically active substances (e.g., cerium or noble metals) that can be used as doping component can, if desired, be distributed almost homogeneously in the pyrogenically produced oxide.

Even the phase transition of pyrogenically produced oxides, e.g., from rutile to anatase in the pyrogenically produced titanium oxide, can be influenced by doping.

In one embodiment of the invention a pyrogenically produced silicic acid doped by aerosol with aluminum oxide can be used in which silicic acid the base component is a silicic acid pyrogenically produced in the manner of flame oxidation, or, preferably, of flame hydrolysis that is doped with a doping component of $1\times10^{-4}$ and up to 20% by wt., the doping amount is preferably in a range of 1 to 10,000 ppm and the doping component is a salt or a salt mixture of aluminum or a suspension of an aluminum compound or of metallic aluminum or mixtures thereof with the BET surface of the doped oxide between 5 and 600 $m^2/g$, preferably in a range between 40 and 100 $m^2/g$.

The silicic acid can have a DBP number of below 100 g/100 g.

The pyrogenically produced silicic acids doped by aerosol with aluminum oxide can be produced in that an aerosol in fed into a flame such as is used for the pyrogenic production of silicic acids in the manner of flame oxidation or, preferably flame hydrolysis, the aerosol is homogeneously mixed before the reaction with the gaseous mixture of the flame oxidation or flame hydrolysis, then the aerosol/gaseous mixture is allowed to react in the flame and the pyrogenically produced silicic acids doped with aluminum oxide are separated from the gas current in a known manner, that an aqueous solution is used to produce the aerosol that contains salts or saline mixtures of aluminum or the metal itself in dissolved or suspended form or mixtures thereof, and that the aerosol is produced by atomization by means of a two-fluid nozzle or some other type of aerosol generation, preferably by an aerosol generator in accordance with ultrasonic atomization.

The following are used by way of example as salts: $AlCl_3$, $Al_2(SO_4)_3$, $Al(NO_3)_3$.

Further subject matter of the invention is the use of the pyrogenically produced, surface-modified and doped oxides in accordance with the invention as Improvement of the surface quality in coating systems,
Reinforcing filler in silicon rubber, rubber and resins,
Charge stabilizer and free-flow agent in toner powder
Free-flow agent
Antiblocking agent, e.g., in foils
UV blocker, e.g., in cosmetics
Thickening agent, e.g., in paints and other coating systems,
Thickening agent, e.g., in resins such as polyester.

As a result of the surface modification the products in accordance with the invention can be worked in more rapidly and in a higher concentration into organic systems such as, e.g., polyester resin.

BRIEF DESCRIPTION OF THE DRAWINGS

FIG. 1 shows the burner arrangement used in the examples.

DETAILED DESCRIPTION OF THE INVENTION

EXAMPLES

The burner arrangement used in examples 1 to 5 is schematically shown in FIG. 1.

According to FIG. 1 the core piece of the apparatus is burner 1 with a known construction such as is usually used to produce pyrogenic oxides. Burner 1 consists of central tube 2 that empties into nozzle 3 from which the main gas current flows into the burner chamber and bums off there. The inner nozzle is surrounded by annular nozzle 4 (jacket nozzle), from which ring hydrogen or secondary hydrogen flows in order to prevent cakings.

Axial tube 5, that terminates a few centimeters before nozzle 3 of central tube 2, is located in the central tube. The aerosol is fed into axial tube 5 and the aerosol gas current of axial tube 5 is homogeneously mixed with the gas current of central tube 2 in the last stretch of central tube 2. The aerosol is produced in aerosol generator 6 (ultrasonic atomizer). An aqueous saline solution containing the metal or metalloid to be doped as salt in dissolved or dispersed/suspended form is used as aerosol educt. The aerosol generated by aerosol generator 6 is conducted by a carrier gas current through heating zone 7 where the water evaporates and small saline crystals remain in finely distributed form in the gaseous phase. Such a device is shown in DE 196 50 500 A1.

Example 1

Doping with Cerium 4.44 kg/h $SiCl_4$ are evaporated at approximately 130° C. and introduced into the central tube of the burner. In addition, 3 $Nm^3/h$ primary hydrogen and 8.0 $Nm^3/h$ air are fed into the central tube. The gaseous mixture flows out of the inner nozzle of the burner and burns into the burner chamber and the subsequent, water-cooled flame tube. In order to avoid cakings on the nozzles 0.5 $Nm^3/h$ jacket hydrogen or secondary hydrogen is fed into the jacket nozzle surrounding the central nozzle. In addition, 12 $Nm^3/h$ secondary air is fed into the burner chamber.

The aerosol flows out of the axial tube into the central tube. The aerosol is a cerium salt aerosol generated by ultrasonic atomization of a 5% aqueous cerium(III) chloride solution in the aerosol generator in an amount of 210 g/h.

The cerium salt aerosol is conducted with the aid of the carrier gas of 0.5 Nm³/h air through a heated line during which the aerosol passes at temperatures of approximately 180° C. into a gas and a saline crystal aerosol.

The temperature of the gaseous mixture ($SiCl_4$/air/hydrogen, aerosol) is 180° C. at the burner mouth.

The reaction gases and the pyrogenically produced silicic acid doped with cerium are drawn through a cooling system by applying a vacuum and cooled down thereby to approximately 100 to 160° C. The solid is separated in a filter or cyclone from the gas current.

The doped, pyrogenically produced silicic acid accumulates as a white, fine powder. In a further step the adhering silicic acid remnants are removed from the silicic acid at an elevated temperature by a treatment with air containing water vapor.

The BET surface of the doped, pyrogenically produced silicic acid is 143 m²/g.

The production parameters are collated in table 1.

Further analytical data of the pyrogenic silicic acid obtained is indicated in table 2.

Example 2

Doping with Cerium 4.44 kg/h $SiCl_4$ are evaporated at approximately 130° C. and introduced into the central tube of the burner. In addition, 3 Nm³/h primary hydrogen and 8.7 Nm³/h air are fed into the central tube. The gaseous mixture flows out of the inner nozzle of the burner and burns into the burner chamber and the subsequent, water-cooled flame tube. In order to avoid cakings on the nozzles 0.5 Nm³/h jacket hydrogen or secondary hydrogen is fed into the jacket nozzle surrounding the central nozzle. In addition, 12 Nm³/h secondary air is fed into the burner chamber.

The aerosol flows out of the axial tube into the central tube. The aerosol is a cerium salt aerosol generated by ultrasonic atomization of a 5% aqueous cerium(III) chloride solution in the aerosol generator in an amount of 205 g/h.

The cerium salt aerosol is conducted with the aid of the carrier gas of 0.5 Nm³/h air through a heated line during which the aerosol passes at temperatures of approximately 180° C. into a gas and a saline crystal aerosol.

The temperature of the gaseous mixture ($SiCl_4$/air/hydrogen, aerosol) is 180° C. at the burner mouth.

The reaction gases and the pyrogenically produced silicic acid doped with cerium are drawn through a cooling system by applying a vacuum and cooled down thereby to approximately 100 to 160° C. The solid is separated in a filter or cyclone from the gas current.

The doped, pyrogenically produced silicic acid accumulates as a white, fine powder. In a further step the adhering silicic acid remnants are removed from the pyrogenic silicic acid at an elevated temperature by a treatment with air containing water vapor.

The BET surface of the doped, pyrogenically produced silicic acid is 217 m²/g.

The production parameters are collated in table 1.

Further analytical data of the pyrogenic silicic acid obtained is indicated in table 2.

Example 3

Doping with Potassium Salts 4.44 kg/h $SiCl_4$ are evaporated at approximately 130° C. and introduced into the central tube of the burner. In addition, 3 Nm³/h primary hydrogen and 8.7 Nm³/h air are fed into the central tube. The gaseous mixture flows out of the inner nozzle of the burner and burns into the burner chamber and the subsequent, water-cooled flame tube. In order to avoid cakings on the nozzles 0.5 Nm³/h jacket hydrogen or secondary hydrogen is fed into the jacket nozzle surrounding the central nozzle. In addition, 12 Nm³/h secondary air is fed into the burner chamber.

The aerosol flows out of the axial tube into the central tube. The aerosol is a potassium salt aerosol generated by ultrasonic atomization of a 0.5% aqueous potassium chloride solution in the aerosol generator in an amount of 215 g/h.

The potassium salt aerosol is conducted with the aid of the carrier gas of 0.5 Nm³/h air through a heated line during which the aerosol passes at temperatures of approximately 180° C. into a gas and a saline crystal aerosol.

The temperature of the gaseous mixture ($SiCl_4$/air/hydrogen, aerosol) is 180° C. at the burner mouth.

The reaction gases and the pyrogenically produced silicic acid doped with potassium are drawn through a cooling system by applying a vacuum and the particle gas current cooled down thereby to approximately 100 to 160° C. The solid is separated in a filter or cyclone from the gas current.

The doped, pyrogenically produced silicic acid accumulates as a white, fine powder. In a further step the adhering silicic acid remnants are removed from the pyrogenic silicic acid at an elevated temperature by a treatment with air containing water vapor.

The BET surface of the doped, pyrogenically produced silicic acid is 199 m²/g.

The production parameters are collated in table 1.

Further analytical data of the pyrogenic silicic acid obtained is indicated in table 2.

TABLE 1

Experimental conditions in the production of doped, pyrogenic silicic acids

| No. | $SiCl_4$ Kg/h | Primary air Nm³/h | Sec-air Nm³/h | $H_2$ Core Nm³/h | $H_2$ Jacket Nm³/h | $N_2$ Jacket Nm³/h | Gas temp. C. | Saline Solution | Aerosol amount kg/h | Air aerosol Nm³/h | BET m²/g |
|---|---|---|---|---|---|---|---|---|---|---|---|
| 1 | 4.44 | 8.0 | 12 | 3 | 0.5 | 0.3 | 180 | 5% $CeCl_3$ | 0.210 | 0.5 | 143 |
| 2 | 4.44 | 8.7 | 12 | 3 | 0.5 | 0.3 | 180 | 5% $CeCl_3$ | 0.205 | 0.5 | 217 |
| 3 | 4.44 | 8.7 | 12 | 3 | 0.5 | 0.3 | 180 | 0.5% KCL | 0.215 | 0.5 | 199 |

Explanation: Primary air = amount of air in the central tube; Sec-air = secondary air; $H_2$-core = hydrogen in the central tube; Gas temp. = gas temperature on the nozzle of the central tube; Aerosol amount = massive current of the saline solution converted in aerosol form; Air aerosol = carrier gas amount (air) of the aerosol

TABLE 2

Analytical data of the specimens obtained according to examples 1 to 3

| No. | BET (m²/g) | CE wt. µg/g | K wt. µg/g | Cl content ppm | TV wt. % | GV wt. % | Cl ppm | Grindo meter µm | Sedi vol. vol. % | Efficiency | pH 4% sus. | Stamping density g/l | Thickening in Ludopal (mPas) |
|---|---|---|---|---|---|---|---|---|---|---|---|---|---|
| Doping with cerium salt and reference examples |
| 1 | 143 | 1860 | <5 |  | 0.09 | 1.33 |  | 20 | 0 | 690 | 3.93 | 26 | 1990 |
| 2 | 217 | 2350 | <5 | 112 | 0.22 | 2.23 | 112 | 40 | 50 | 548 | 3.67 | 29 | 3680 |
| Doping with potassium salt and reference examples |
| 3 | 199 |  | 300 | 55 | 0.32 | 1.86 | 55 | 60 | 50 | 451 | 4.83 | 32 | 2575 |

Explanation: Cerium content as Ce in µg/g (ppm); potasssium content as K in µg/g; TV = drying loss (2 h at 105° C. in accordance with DIN/ISO 787/II, ASTM D 280, JIS K 5101/21); GV = annealing loss (2 h at 1000° C., in accordance with DIN 55921, ASTM D 1208, JIS K 5101/23 relative to the substance dried 2 h at 105° C.); grindometer = grindometer value;
Sedi-vol. = sediment volume; efficiency = turbulence measurement: The method of determining efficiency (turbulence measurement) is described in patent DE 44 00 170; the suspension produced according to the same method is utilized after a further 5 minutes waiting time to determine the sediment volume; stamping density in accordance with DIN/ISO 787/IX, JIS K 5101/18 (not sieved).
Thickening in polyester reference system: Described in EP-A 0,015,315.

Example 4

Production of a Pyrogenically Produced Silicic Acid Doped by Aerosol with Aluminum Oxide and with a Low BET Surface 5.25 kg/h $SiCl_4$ are evaporated at approximately 130° C. and transferred into central tube 2 of burner 1 of a known design. 3.47 Nm³/h (primary) hydrogen and 3.76 Nm³/h air as well as 0.95 Nm³/h oxygen are additionally fed into central tube 2. The gaseous mixture flows out of nozzle 3 of burner 1 and burns into the burner chamber and the adjacent, water-cooled fire tube.

0.5 Nm³/h (jacket or secondary) hydrogen and 0.3 Nm³/h nitrogen are fed into ring nozzle 4.

20 Nm³/h (secondary) air are additionally fed into the burner chamber.

The second gas current flows out of axial tube 5 into central tube 2.

The second gas current consists of the aerosol produced by ultrasonic atomization of $AlCl_3$ solution in separate atomization unit 6. Aerosol generator 6 atomizes 460 g/h 2.29% aqueous aluminum chloride solution thereby. The aluminum chloride aerosol is conducted with the aid of the carrier gas of 0.5 Nm³/h air through the heated line, during which the aqueous aerosol changes at temperatures of approximately 180° C. into a gas and a salt crystal.

The temperature of the gaseous mixture ($SiCl_4$/air/hydrogen, water/aerosol) is 180° C. at the burner mouth.

The reaction gases and the pyrogenically produced silicic acid doped by aerosol with aluminum oxide are drawn through a cooling system by applying a vacuum. The particle gas current is cooled down thereby to approximately 100 to 160° C. The solid is separated from the waste-gas current in a cyclone.

The pyrogenically produced silicic acid doped by aerosol with aluminum oxide precipitates as a white, fine powder. In a further step any still-adhering remnants of hydrochloric acid are removed from the silicic acid at elevated temperature by a treatment with air containing water vapor.

The BET surface of the pyrogenic silicic acid doped by aerosol with aluminum oxide is 55 m²/g.

The production conditions are listed in table 3. Further analytical data of the silicic acid is indicated in table 4.

Example 5

Production of a Pyrogenically Produced Silicic Acid Doped by Aerosol with Aluminum Oxide and with a High BET Surface 4.44 kg/h $SiCl_4$ are evaporated at approximately 130° C. and transferred into central tube 2 of burner 1 of a known design. 3.15 Nm³/h (primary) hydrogen and 8.2 Nm³/h air are additionally fed into central tube 2. The gaseous mixture flows out of nozzle 3 of burner 1 and burns into the burner chamber and the adjacent, water-cooled fire tube.

0.5 Nm³/h (jacket or secondary) hydrogen and 0.3 Nm³/h nitrogen are fed into ring nozzle 4.

12 Nm³/h (secondary) air are additionally fed into the burner chamber.

The second gas current flows out of axial tube 5 into central tube 2.

The second gas current consists of the aerosol produced by ultrasonic atomization of $AlCl_3$ solution in separate atomization unit 6. Aerosol generator 6 atomizes 450 g/h 2.29% aqueous aluminum chloride solution thereby. The aluminum chloride aerosol is conducted with the aid of the carrier gas of 0.5 Nm³/h air through the heated line, during which the aqueous aerosol changes at temperatures of approximately 180° C. into a gas and a salt crystal.

The temperature of the gaseous mixture ($SiCl_4$/air/hydrogen, water/aerosol) is 180° C. at the burner mouth.

The reaction gases and the pyrogenically produced silicic acid doped by aerosol with aluminum oxide are drawn through a cooling system by applying a vacuum. The particle gas current is cooled down thereby to approximately 100 to 160° C. The solid is separated from the waste-gas current in a cyclone.

The pyrogenically produced silicic acid doped by aerosol with aluminum oxide precipitates as a white, fine powder. In a further step any still-adhering remnants of hydrochloric acid are removed from the silicic acid at elevated temperature by a treatment with air containing water vapor.

The BET surface of the pyrogenic silicic acid doped by aerosol with aluminum oxide is 203 m²/g.

The production conditions are listed in table 3. Further analytical data of the silicic acid is indicated in table 4.

TABLE 3

Experimental conditions in the production of pyrogenic silicic acid doped with aluminum oxide

| No. | SiCl$_4$ Kg/h | Primary air Nm$^3$/h | O$_2$ Core Nm$^3$/h | Sec-air Nm$^3$/h | H$_2$ Core Nm$^3$/h | H$_2$ Jacket Nm$^3$/h | N$_2$ Jacket Nm$^3$/h | Gas temp. °C. | Saline Solution | Aerosol Amount kg/h | Air aerosol Nm$^3$/h | BET m$^2$/g |
|---|---|---|---|---|---|---|---|---|---|---|---|---|
| 4 | 5.25 | 3.76 | 0.95 | 20 | 3.47 | 0.5 | 0.3 | 156 | 2.29% aqueous AlCl$_3$ | 0.46 | 0.5 | 55 |
| 5 | 4.44 | 8.2 | 0 | 12 | 3.15 | 0.5 | 0.3 | 180 | 2.29% aqueous AlCl$_3$ | 0.45 | 0.5 | 203 |

Explanation: Primary air = amount of air in the central tube; Sec-air = secondary air; H$_2$-core [nucleus] = hydrogen in the central tube; Gas temp. = gas temperature on the nozzle of the central tube; Aerosol amount = massive current of the saline solution converted in aerosol form; Air aerosol = carrier gas amount (air) of the aerosol

TABLE 4

Analytical data of the specimens obtained according to examples 1 to 2-4 and 5]

| | BET m$^2$/g | PH 4% sus. | Stamping density g/l | DBP absorption g/100 g | Al$_2$O$_3$ content % by wt. | Si$_2$O$_3$ content % by wt. | Chloride content ppm |
|---|---|---|---|---|---|---|---|
| Ex. No. 4 | 55 | 4.39 | 94 | 81 | 0.187 | 99.79 | 89 |
| Ex. No. 5 | 203 | 4.15 | 24 | 326 | 0.27 | 99.67 | |
| In comparison thereto | | | | | | | |
| Aerosil OX 50 | 50 | 3.8-4.8 | 130 | 160 | <0.08 | >99.8 | <250 |

Explanation: pH 4% sus. = pH of the four-percent aqueous suspension

An oxide according to example 4 is sprayed in a suitable mixing container under intensive mixing, if necessary with water or dilute acid at first and subsequently with one or more or a mixture of several surface-modifying reagents (hydrophobing agents), subsequently mixed 15 to 30 minutes, if necessary and tempered at a temperature of 100 to 400° C. for a period of 0.5-6 h. The tempering can take place under protective gas.

The amount ratios used are listed in table 5. The characteristic physicochemical data of the surface-modified oxides obtained are listed in table 6.

TABLE 6

Physicochemical data of the oxides produced

| Designation | BET surface (m$^2$/g) | pH | Stamping density (g/l) | C content (%) | Drying loss (%) | Annealing loss (%) |
|---|---|---|---|---|---|---|
| Example 6 | 46 | 6.4 | 92 | 2.0 | 0.8 | 2.9 |
| Example 7 | 51 | 7.2 | 104 | 0.8 | 0.1 | 0.9 |
| Example 8 | 48 | 6.2 | 107 | 0.9 | 0.2 | 0.8 |

TABLE 5

| Designation | Hydrophobing agent | Parts/100 parts oxide | H$_2$/O addition parts/100 parts oxide | Tempering time (h) | Tempering temperature (° C.) |
|---|---|---|---|---|---|
| Example 6 | Si 108 | 5 | 1** | 2 | 120 |
| Example 7 | HMDS | 5 | 1 | 2 | 140 |
| Example 8 | HMDS | 10 | 2 | 2 | 140 |
| Example 9 | PDMS | 7.5 | — | 2 | 400 |
| Example 10 | AMEO | 7 | 2 | 3 | 130 |

*Si 108: Octyltrimethoxysilane
HMDS: Hexamethyldisilazane
PDMS: Polydimethylsiloxane, here Rhodorsil 47 V 100
AMEO: γ-Aminopropyltriethoxysilane
**0.01n HCL was used here instead of H$_2$O TABLE 6-continued Physicochemical data of the oxides produced

| Designation | BET surface ($m^2/g$) | pH | Stamping density (g/l) | C content (%) | Drying loss (%) | Annealing loss (%) |
|---|---|---|---|---|---|---|
| Example 9 | 45 | 7.2 | 104 | 2.0 | 0.1 | 2.1 |
| Example 10 | 49 | 9.6 | 94 | 1.1 | 0.8 | 2.0 |

Further variations and modifications will be apparent to those skilled in the art from the foregoing and are intended to be encompassed by the claims appended hereto. German priority application 10109484.1 is relied on and incorporated herein by reference.

The invention claimed is:

1. A rapid dissolving reinforcing filler composition for organic systems comprising a reinforcing amount of surface-modified, aerosol doped-pyrogenically produced oxides wherein the dopant is aluminum or salts or oxides thereof, wherein the pyrogenically produced oxide is $SiO_2$ and wherein the surface modification is a hydrophobic surface obtained by spraying the pyrogenic oxides, having a BET surface between 40 and 217 $m^2/g$ and dopant homogeneously distributed within the pyrogenically produced oxide, with one or several compounds selected from the group consisting of octyltrimethoxysilane (Si 108), hexamethyldisilazane (HMDS), polydimethylsiloxane (PDMS) and γ-aminopropyltriethoxysilane (AMEO).

2. A method of producing aerosol doped, surface-modified pyrogenically produced oxides, comprising placing aerosol doped-pyrogenically produced oxides, having a BET surface is between 40 and 217 $m^2/g$ and dopant homogeneously distributed within the pyrogenically produced oxide, in a suitable mixing container, spraying the oxides with water and/or acid and then spraying the oxides under intensive mixing with the surface-modification reagent or a mixture of several surface-modification reagents under conditions where oxygen is excluded, to form the aerosol doped, surface-modified, pyrogenically produced oxides, wherein the dopant is aluminum, or salts or oxides thereof, wherein the oxide is $SiO_2$, and wherein the surface modification reagent or a mixture of several surface-modification reagents are selected from the group consisting of octyltrimethoxysilane (Si 108), hexamethyldisilazane (HMDS), polydimethylsiloxane (PDMS) and γ-aminopropyltriethoxysilane (AMEO).

* * * * *